United States Patent [19]

Ting

[11] Patent Number: 4,892,904

[45] Date of Patent: Jan. 9, 1990

[54] GLASS-REINFORCED BLENDS OF POLYPHENYLENE ETHER RESIN AND POLYOLEFIN HAVING IMPROVED HEAT DISTORTION TEMPERATURE

[75] Inventor: Sai-Pei Ting, Delmar, N.Y.

[73] Assignee: General Electric Company, Selkirk, N.Y.

[21] Appl. No.: 211,697

[22] Filed: Jun. 27, 1988

Related U.S. Application Data

[63] Continuation of Ser. No. 658,476, Oct. 9, 1984, abandoned.

[51] Int. Cl.$^4$ .......................... C08K 3/40; C08L 71/04
[52] U.S. Cl. .................... 524/494; 524/504; 524/505; 524/508; 524/492; 525/68; 525/71; 525/92; 525/132
[58] Field of Search .................... 525/68, 71, 92, 132; 524/494, 508, 492

[56] References Cited

U.S. PATENT DOCUMENTS

| | | |
|---|---|---|
| 3,257,357 | 6/1966 | Stamatoff . |
| 3,257,358 | 6/1966 | Stamatoff . |
| 3,306,874 | 2/1967 | Hay . |
| 3,306,875 | 2/1967 | Hay . |
| 3,383,435 | 5/1968 | Cizek . |
| 4,101,504 | 7/1978 | Cooper et al. ...................... 524/508 |
| 4,166,055 | 8/1979 | Lee, Jr. . |
| 4,172,826 | 10/1979 | Haaf et al. ........................ 524/508 |
| 4,195,011 | 3/1980 | Gasman et al. .................... 524/494 |
| 4,239,673 | 12/1980 | Lee, Jr. . |
| 4,410,651 | 10/1983 | Haaf et al. ........................ 524/127 |
| 4,442,251 | 4/1984 | Haaf et al. ........................ 524/141 |

Primary Examiner—Carman J. Seccuro
Attorney, Agent, or Firm—Hedman, Gibson, Costigan & Hoare

[57] ABSTRACT

The flexural modulus and heat distortion temperature of environmentally tough, compatible blends of polyphenylene ether resin, poly(alkenyl aromatic) resin, polyolefin resin and an alkenyl aromatic-based compatibilizer are improved by the inclusion in the blend of minor amounts of fibrous glass, as described. The compositions are injection moldable into various shaped articles.

25 Claims, No Drawings

GLASS-REINFORCED BLENDS OF POLYPHENYLENE ETHER RESIN AND POLYOLEFIN HAVING IMPROVED HEAT DISTORTION TEMPERATURE

This is a continuation of application Ser. No. 658,476 filed Oct. 9, 1984, now abandoned.

BACKGROUND OF THE INVENTION

The polyphenylene ether resins have enjoyed an increasing reputation as a distinct class of engineering thermoplastics that are admixable with polystyrene resins and moldable into various articles having good physical properties.

The polyphenylene ether resins and methods of their preparation are described in the patent literature, including U.S. Pat. Nos. 3,306,874 and 3,306,875(Hay) and U.S. Pat. Nos. 3,257,357 and 3,257,358(Stamatoff). Blends of polyphenylene ether resin and polystyrene resin, including rubber modified polystyrene, are described in U.S. Pat. No. 3,383,435(Cizek), and elsewhere.

More recently, interest has grown in developing thermoplastic blends of a polyphenylene ether resin and a polyolefin resin because molded composites made from such blends show promise as materials which are highly resistant to environmental stress cracking. This property has special importance in commercial applications where the molded part or article is exposed to aggressive solvents. In such cases, the chemical action of the solvent combined with the stresses inherent in the molded plastic part as a consequence of manufacture, can and often do result in the propagation of cracks or fissures in the interior of the molded part. Ultimately, product failure can result.

Because polyphenylene ether resins and polyolefin resin exhibit a relatively low tolerance for each other in the normal case, it is usually advantageous to add another material to act as a compatibilizer, enabling the admixture of the two polymers over a wider range of relative amounts yet achieving a homogeneous, single phase melt when the composition is processed at elevated temperatures. The prior art has shown, for instance, that the presence of certain additional polymers permits the incorporation of larger amounts of, for example, polyethylene in polyphenylene ether resin compositions. More specifically, elastomeric triblock copolymers of a vinyl aromatic compound, e.g., styrene, and a conjugated diene, e.g., butadiene, have proved useful as a compatibilizer, as disclosed in U.S. Pat. No. 4,239,673(Lee, Jr.). Hydrogenated derivatives of the same triblock copolymer have also been shown to be useful for the same purpose, as described in U.S. Pat. No. 4,166,055(Lee, Jr.). Diblock copolymers of a vinyl aromatic compound and a diene have been investigated, and they, too, have manifested the same utility.

Without such compatibilizing agents, compositions of polyphenylene ether resin and large amounts of polyolefin often form a multi-phase liquid when molten. When the melt hardens in the mold, seams form along the interfaces between these phases, or layers. A result is that during use the molded part often undergoes delamination, that is, separation along these seams occurs. Even if separation does not occur, some of the physical properties of such molded parts are often inferior. The presence of the compatibilizing agent, on the other hand, enables the formation of a true alloy, that is, a homogeneous, single-phase melt which hardens into an article that does not tend to delaminate.

A shortcoming of environmentally toughened, compatibilized blends, however, is that the flexural modulus, an important property, is lower than that of a more conventional blend of polyphenylene ether resin and polystyrene without a polyolefin present. Thus, there is a need for environmentally toughened polyphenylene ether blends which are also characterized by improved flexural modulus.

SUMMARY OF THE INVENTION

It has now been discovered that the inclusion of fibrous glass in an environmentally toughened blend comprising a polyphenylene ether resin, a poly(alkenyl aromatic) homopolymer resin, a polyolefin and an alkenyl aromatic co- or terpolymeric compatibilizing agent, unexpectedly provides better flexural modulus, together with a sharply higher heat distortion temperature.

In comparison with the conventional way of increasing the heat distortion temperature of an environmentally toughened blend, which is by varying the polyphenylene ether/polystyrene ratio, the glass fiber-containing blends of this invention exhibit superior flow in the melt, which facilitates processing. Moreover, the positive effect of the fibrous glass additive on both the flexural modulus and the heat distortion temperature is manifested regardless of which polyolefin is employed or which styrenic co-or terpolymer is used as the compatibilizing agent. These effects are shown in the examples set forth at the end of the following description.

The terms "fibers" and "filaments" are used throughout this disclosure interchangeably.

DESCRIPTION OF THE INVENTION

Briefly described, the compositions which are the subject matter of this invention comprise homogeneous thermoplastic admixtures of
  (a) a polyphenylene ether resin;
  (b) a poly(alkenyl aromatic) resin, with or without a rubber modifier;
  (c) a polyolefin resin;
  (d) an alkenyl aromatic copolymer or terpolymer in an amount which improves the compatibility between components (a) and (c); and
  (e) an amount of a fibrous glass reinforcement which is effective to increase both the flexural modulus and the heat distortion temperature of the blend comprising (a), (b), (c) and (d).

It should be understood that the relative amounts of the polymeric components in the present kinds of blends can vary widely, depending on particular needs. As is well known, the polyphenylene ether resin, component (a), and the polystyrene resins, component (b), are uniformly admixable in virtually all proportions, for example, from 99:1 to 1:99 on a weight ratio basis. Similarly, the presence of the styrenic copolymer or terpolymer, component (d), enables the incorporation of virtually any amount of the polyolefin resin, component (c), without detracting from important properties. The glass fibers, component (e), will normally be included in minor amounts relative to the weight of (a), (b), (c), (d) and (e) combined.

Preferred for use in the practice of this invention are polyphenylene ether resins which are homopolymers or copolymers having units of the formula

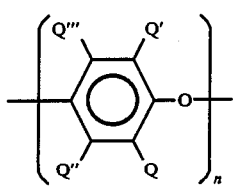 (I)

in which Q, Q', Q" and Q'" are independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20, and more usually at least 50.

These resins are generally self-condensation products of monohydric, monocyclic phenols produced by reacting the phenols with oxygen in the presence of complex metal catalysts, with the molecular weight being controlled by the reaction time, longer times providing a higher average number of repeating units. Particular procedures are known to those skilled in the art and are also described in the patent literature, including the patents of Hay and Stamatoff mentioned above.

By way of illustration, suitable phenolic monomers include 2,6-dimethylphenol; 2,6-diethylphenol; 2,6-dibutylphenol; 2,6-dilaurylphenol; 2,6-dipropylphenyl; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2,6-dimethoxyphenol; 2,3,6-trimethylphenol; 2,3,5,6-tetramethylphenol; and 2,6-diethoxyphenol.

Some of the polymers which can be produced and are within the above formula are
poly(2,6-dilauryl-1,4-phenylene)ether;
poly(2,6-dimethoxy-1,4-phenylene)ether;
poly(2,6-diethoxy-1,4-phenylene)ether;
poly(2-methoxy-6-ethoxy-1,4-phenylene)ether;
poly(2-ethyl-6-stearyloxy-1,4-phenylene)ether;
poly(2,6-dichloro-1,4-phenylene)ether;
poly(2-methyl-6-phenyl-1,4-phenylene)ether;
poly(2,6-dibenzyl-1,4-phenylene)ether;
poly(2-ethoxy-1,4-phenylene)ether;
poly(2-chloro-1,4-phenylene)ether;
poly(2,6-dibromo-1,4-phenylene)ether; and the like.

Also contemplated for use as component(a) are polyphenylene ether copolymers, such as those prepared from mixtures of the comonomers mentioned above. Examples of such copolymers include
poly(2,6-dimethyl-co-2,3,6-trimethyl-1,4-phenylene)ether and
poly(2,6-dimethyl-co-2-methyl-6-butyl-1,4-phenylene)ether.

Especially preferred for use in the present invention are polyphenylene ether homopolymers having alkyl substituents in the two positions ortho to the oxygen ether atom, that is, those polymers of the above formula in which Q and Q' are alkyl, particularly alkyl having from 1 to 4 carbon atoms. Most preferred is poly(2,6-dimethyl-1,4-phenylene)ether resin.

Component (b) is, as mentioned, a homopolymeric alkenyl aromatic resin. Preferably, the resin is selected from among those in which the polymeric units are derived from compounds of the formula

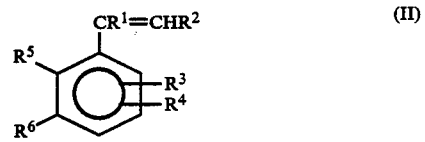 (II)

in which $R^1$ and $R^2$ are selected from the group consisting of lower alkyl or alkenyl groups of from 1 to 6 carbon atoms, and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl or alkenyl groups of from 1 to 6 carbon atoms; or $R^5$ and $R^6$ may be concatenated together with hydrocarbyl groups to form a naphthyl group.

Compounds within the above formula include styrene, as well as its homologs and analogs such as alpha-methyl styrene, para-methyl styrene, 2,4-dimethyl styrene, chlorostyrene, dichlorostyrene, bromostyrene, dibromostyrene, p-tert-butylstyrene, p-ethylstyrene, vinyl xylene, divinylbenzene, and vinyl naphthalene. Styrene is the most preferred.

The alkenyl aromatic resin which comprises component(b) can be and preferably is modified with rubber, either during or after polymerization, in the conventional manner for the formation of rubber modified poly(alkenyl aromatic) resins (which are often referred to in the art as "high impact polystyrene" or "HIPS"). Suitable rubber modifiers include natural rubber, as well as synthetic rubbers such as polyisoprene, polybutadiene, polychloroprene, polyacrylonitrile, polyurethane, polyorganosiloxane, ethylene-propylene copolymers(EPR), ethylene-propylene-diene terpolymers(EPDM rubber), and so forth.

The rubber content of the rubber modified poly(alkenyl aromatic) resin can vary conventionally, for instance, within the range from about 5 to about 45 percent by weight based on component(b).

The polyolefin resin, component(c), is preferably a homopolymer or copolymer based on units of $C_2$ to $C_4$ olefin, that is, polyethylene, polypropylene or polybutylene.

Especially preferred are ethylene homopolymers and copolymers, including polyethylene and copolymers of ethylene and alkyl acrylate, for example, ethylene-co-methyl acrylate, ethylene-co-ethyl acrylate, and the like, as well as copolymers of ethylene and acrylic acid and methacrylic acid, and so forth. Suitable polyethylenes include high density polyethylene (HDPE), low density polyethylene (LDPE) linear low density polyethylene (LLDPE), and medium density polyethylene (MDPE). In general, the terms low, medium and high density polyethylene refer to the ASTM designations, with the density and melt index being the two more commonly used criteria for categorizing the polyethylene.

Further details regarding the ethylene homopolymers and copolymers are found in the Modern Plastics Encyclopedia, 1982-1983 Edition, pages 73-82, which is incorporated herein by reference.

The compatibilizing agent for the polyphenylene ether and polyolefin resin, component(d), is preferably an alkenyl aromatic diblock copolymer or alkenyl aromatic triblock copolymer in which one, or more, of the blocks consists of a poly(alkenyl aromatic) resin and one of the blocks consists of a polydiene. The poly(alkenyl aromatic) resin can be based on compounds of the same formula set forth above (Formula II). The polydiene is derived from a conjugated diene rubber precursor, for example, 1,3-butadiene; 2-methyl-1,3-butadiene(isoprene); and 1,3-pentadiene(piperylene).

Especially preferred are diblock and triblock copolymers of styrene and butadiene, that is, AB and ABA block copolymers in which A designates the poly(alkenyl aromatic) block or blocks and B designates the polydiene block. Also suitable are hydrogenated derivatives thereof such as polystyrene-ethylene/butylene-polystyrene block copolymers. Such materials are known to those skilled in the art as effective compatibilizers for polyphenylene ether/polyolefin blends; see, for example, U.S. 4,166,055(Lee, Jr.) and U.S. 4,239,673(Lee, Jr.).

The glass reinforcement, component(e), is compound of glass filaments or fibers. Preferably, they are comprised of lime-aluminum borosilicate glass, and especially glass having a low soda content, such as the "C" and "E" types.

The glass filaments may be made by standard processes, for example, by steam or air blowing, flame blowing and mechanical pulling. The filaments may range in diameter from about 0.00012 to about 0.00075 inch.

In preparing formulations in accordance with this invention, it is convenient, though not necessary, to use the filamentous glass in the form of chopped strands of from about one-eighth to about 2 inches long, although even shorter lengths might be more advantageous for same applications. Care should be taken not to employ too many strands which are very long or very short.

Most preferred for this invention are glass fibers or filaments characterized by an average diameter of from about 0.005 to about 0.05 inch and an average length from about 1/32 to about ¼ inch.

In the preferred embodiments of this invention, the amounts of the foregoing ingredients will vary as follows:

| | Amount, Parts by Weight |
|---|---|
| Polyphenylene ether resin, component (a) | about 5 to about 95 |
| Poly(alkenyl aromatic) resin, component (b) | about 95 to about 5 |
| Polyolefin resin, component (c) | about 5 to about 95 |
| Alkenyl aromatic co- or terpolymer, component (d) | about 2 to about 30 |
| Fibrous glass, component (e) | about 5 to about 50 |

The compositions may be prepared into shaped articles by forming a mixture of the ingredients using a mechanical blending device, extruding the mixture through a screw extruder at a temperature from about 500° to about 600° F., cooling the extrudate, cutting it into molding pellets, and injection molding the pellets at an injection temperature from about 500° to about 600° F. (mold temperature about 150° to about 200° F.).

The compositions may also contain other ingredients in addition to those already mentioned. The additional ingredients may be selected from among known supplementary materials for polyphenylene ether resin compositions, examples of which are plasticizers, flame retardant agents, stabilizers, antioxidants, processing aids, colorants (e.g., pigments or dyes), mineral fillers (e.g., clay, mica or talc), and so forth. Conventional amounts are used.

Articles of various shapes and sizes can be prepared from the compositions using the above mentioned procedure. In general, the present kinds of compositions are utilizable for the same purposes for which polyphenylene ether resin blends have become known to those skilled in the art.

The invention is illustrated further in the examples which follow.

EXAMPLES 1-11

Compositions in accordance with this invention were prepared by mixing the ingredients listed below, extruding the mixture through a twin screw extruder at a temperature of 550° F. using a 5-6 gauge torque, and injection molding the extruded material into test pieces using an injection temperature of 570° F. and a mold temperature of 150° F., under 500 psi of pressure. The results are reported in Table 1.

TABLE 1

| Ingredients, Parts by weight* | 1 | 2 | 3 | 4 | 5 | 6 | 7 | 8 | 9 | 10 | 11 |
|---|---|---|---|---|---|---|---|---|---|---|---|
| Poly(2,6-dimethyl-1,4-phenylene)resin$^a$ | 42 | 42 | 42 | 42 | 42 | 42 | 42 | 42 | 42 | 42 | 42 |
| High impact, rubber modified polystyrene$^b$ | 35 | 35 | 35 | 35 | 35 | 35 | 35 | 35 | 35 | 35 | 35 |
| Hydrogenated styrene-butadiene-styrene triblock copolymer$^c$ | 8 | 8 | 8 | 8 | 8 | 8 | 8 | 8 | — | — | — |
| Styrene-ethylene/butylene-styrene triblock copolymer$^d$ | — | — | — | — | — | — | — | — | 8 | 8 | 8 |
| Low density polyethylene$^e$ | 15 | 15 | 15 | 15 | 15 | 15 | — | — | 15 | — | — |
| Linear low density polyethylene$^f$ | — | — | — | — | — | — | 15 | — | — | 15 | — |
| Ethylene-ethyl acrylate copolymer$^g$ | — | — | — | — | — | — | — | 15 | — | — | 15 |
| Glass Fibers | — | 5 | 10 | 20 | 30 | 40 | 30 | 30 | 30 | 30 | 30 |
| Properties | | | | | | | | | | | |
| Heat Distortion Temp., °F. | 242 | 253 | 262 | 274 | 281 | 280 | 273 | 277 | 277 | 274 | 274 |
| Notched Izod Impact Strength, ft.lb./in.n. | 9.4 | 3.2 | 2.5 | 2.0 | 1.9 | 2.0 | 1.8 | 1.5 | 1.4 | 2.4 | 1.7 |
| Dynatup Impact Strength, in./lb. | 160 | 29 | 22 | 20 | 18 | 18 | 13 | 11 | 18 | 23 | 20 |
| Flexural Modulus, × $10^{-3}$ psi | 223 | 277 | 332 | 456 | 552 | 580 | 547 | 588 | 586 | 556 | 562 |
| Flexural Strength, × $10^{-3}$ psi | 7.6 | 8.6 | 9.7 | 11.4 | 12.5 | 13.1 | 11.7 | 11.5 | 9.1 | 12.7 | 11.3 |

TABLE 1-continued

| Ingredients, Parts by weight* | 1 | 2 | 3 | 4 | 5 | 6 | 7 | 8 | 9 | 10 | 11 |
|---|---|---|---|---|---|---|---|---|---|---|---|
| Flow Channel Length, inches | 19 | 18.5 | 18 | 17.5 | 17 | 16 | 18 | 19 | 20 | 18 | 20 |
| Mold Shrinkage × 10⁻³ (in./in.) | −3.8 | −4.0 | −3.8 | −2.0 | −1.0 | +0.5 | −0.25 | −0.75 | −1.0 | +1.3 | +7.0 |
| Specific Gravity | 1.02 | 1.03 | 1.06 | 1.13 | 1.17 | 1.20 | 1.18 | 1.19 | 1.25 | 1.22 | 1.24 |

[a] PPO ®, General Electric Company
[b] Foster Grant's 834 HIPS, containing about 8-9% by weight of polybutadiene rubber
[c] Shell's KG-1651
[d] Shell's KD-1101
[e] MN-722, USI
[f] GR-7320, Union Carbide
[g] DPD-6169, Union Carbide
*Each blend also contained 0.8 part by weight of antioxidants/stabilizers

COMPARATIVE EXAMPLES 12–17

For purposes of comparison with the invention, additional blends were prepared without any glass fibers. The same conditions as in the previous examples were used. The ingredients, amounts and test results are reported in Table 2.

TABLE 2

| | 12 | 13 | 14 | 15 | 16 | 17 |
|---|---|---|---|---|---|---|
| Ingredients* pbw | | | | | | |
| PPO[a] | 19 | 31 | 42 | 54 | 65 | 70 |
| FG 834 HIPS[b] | 58 | 46 | 35 | 23 | 12 | 7 |
| KG-1651[c] | 8 | 8 | 8 | 8 | 8 | 8 |
| MN-722 LDPE[e] | 15 | 15 | 15 | 15 | 15 | 15 |
| Properties | | | | | | |
| Heat Distortion Temp., °F. | 197 | 224 | 245 | 269 | 297 | 311 |
| Notched Izod Impact Strength, ft.lb./in.n. | 1.7 | 6.8 | 9.6 | 11.4 | 12.1 | 9.8 |
| Dynatup, in./lb. | 11 | 222 | 243 | 267 | 225 | 136 |
| Flow Channel Length, inches | 34.5 | 28 | 21.5 | 16.5 | 12.25 | 10.5 |
| Flexural Modulus, × 10⁻³ psi | 174 | 193 | 214 | 223 | 224 | 220 |
| Flexural Strength, × 10⁻³ psi | 4.4 | 5.9 | 7.4 | 8.5 | 9.0 | 8.8 | a,b,c and e same as in Table 1.
*Each blend also contained 0.8 pbw of antioxidants/stabilizers As can be seen, increasing the amount of poly(2,6-dimethyl-1,4-phenylene) ether resin (PPO) in the blend and, correspondingly, decreasing the amount of rubber modified polystyrene (FG 834 HIPS) results in an elevation of the heat distortion temperature (HDT). This is accomplished, however, at considerable sacrifice to the melt flow as measured by flow channel length, which decreases sharply from 34.5 inches originally, to only 10.5 inches.

Thus, the conventional way of increasing the heat distortion temperature, does so at the expense of a loss in the melt flow.

The present invention, in contrast, produces elevations in both the heat distortion temperature and the flexural modulus while maintaining the flow channel length.

Other modifications and variations of the invention are possible in the light of this disclosure. For instance, in place of poly(2,6-dimethyl-1,4-phenylene) ether resin, it is possible to use a polyphenylene ether copolymer, such as poly(2,6-dimethyl-co-2,3,6-trimethyl-1,4-phenylene) ether. Instead of a polybutadiene rubber modified polystyrene resin (HIPS), one can substitute an EPDM rubber-modified polystyrene resin. The compositions can also include a clay filler, or a pigment or dye for coloration. Thus, changes may be made in the particular compositions shown without departing from the scope of the invention defined in the appended claims and without sacrificing the chief benefits.

I claim:

1. A thermoplastic composition comprising a homogeneous admixture of
   (a) a polyphenylene ether resin;
   (b) a homopolymeric alkenyl aromatic resin, with or without a rubber modifier;
   (c) from at least 15 to about 95 parts by weight, based upon 100 parts by weight of (a), (b), (c) and (d) of a polyolefin resin;
   (d) an alkenyl aromatic-based copolymer or terpolymer in an amount sufficient to improved the compatibility between components (a) and (c); and
   (e) an amount of fibrous glass effective to increase the flexural modulus and the heat distortion temperature of the composition after molding.

2. A composition according to claim 1, in which the polyphenylene ether resin is poly(2,6-dimethyl-1,4-phenylene)ether.

3. A composition according to claim 1, in which the poly(alkenyl aromatic) resin is polystyrene.

4. A composition according to claim 3, in which the polystyrene is rubber modified.

5. A composition according to claim 1, in which the polyolefin resin is a $C_2$ to $C_4$ olefin polymer.

6. A compositions according to claim 1, in which the polyolefin resin is polyethylene or an ethylene copolymer.

7. A composition according to claim 1, in which the polyolefin resin is a low density or linear low density polyethylene.

8. A composition according to claim 1, in which the polyolefin resin is a copolymer of ethylene and a comonomer selected from the group consisting of acrylic acid, methacrylic acid, methyl acrylate and ethyl acrylate.

9. A composition according to claim 1, in which the polyolefin is an ethylene-ethyl acrylate copolymer.

10. A composition according to claim 1, in which the alkenyl aromatic copolymer or terpolymer is a styrenic copolymer or terpolymer.

11. A composition according to claim 10, in which the styrene copolymer or terpolymer is selected from styrene-butadiene-styrene triblock copolymers, 12. A composition according to claim 11, in which the triblock copolymer has been hydrogenated.

13. A composition according to claim 12, in which the hydrogenated triblock copolymer is a styrene-ethylene/butylene-styrene copolymer.

14. A composition according to claim 1, in which the fibrous glass comprises filaments the average diameter of which is in the range from about 0.00012 to about 0.00075 inch.

15. A composition according to claim 1, in which the glass filaments have an average diameter from about 0.005 to about 0.05 inch.

16. A composition according to claim 1, in which the glass fibers range in length from about one-eight to about 2 inches.

17. A composition according to claim 16, in which the glass filaments have an average length from about 1/32 to about ¼ inch.

18. A composition according to claim 1, in which the glass is of the C or E type.

19. A composition according to claim 1, which comprises from about 5 to about 95 parts by weight of (a), from a 95 to about 5 parts by weight of (b), from about 15 to about 50 parts by weight of (c), from about 2 to about 30 parts by weight of (d) and from about 5 to about 50 parts by weight of (e).

20. A composition according to claim 1, which includes one or more supplementary ingredients selected from the group consisting of plasticizers, processing aids, stabilizers, antioxidants, flame retardants, coloring agents, and mineral fillers.

21. A thermoplastic molding composition which comprises a homogeneous admixture of
   (a) from about 20 to about 80 parts by weight of poly(2,6-dimethyl-1,4-phenylene) ether resin;
   (b) from about 80 to about 20 parts by weight of rubber modified polystyrene;
   (c) at least 15 parts by weight of a copolymer of ethylene and a comonomer selected from the group consisting of acrylic acid, methacrylic acid, methyl acrylate and ethyl acrylate;
   (d) from about 5 to about 15 parts by weight of a hydrogenated styrenic block copolymer wherein two of said blocks consist of poly(alkenyl aromatic) resins and the third block consists of a polydiene; and
   (e) from about 10 to about 40 parts by weight of glass fibers, said fibers having an average diameter from about 0.005 to about 0.05 inch and average length from about 1/32 to about ¼ inch, the parts by weight of (a), (b), (c) and (d) totalling 100 parts by weight.

22. An article molded from the composition of claim 18.

23. An article molded from the composition of claim 21.

24. A composition according to claim 1 wherein component (a) is present in an amount of about 42 parts by weight, component (b) is present in an amount of about 35 parts by weight, component (c) is present in an amount of about 15 parts by weight, component (d) is present in an amount of about 8 parts by weight, and component (e) is present in an amount from about 5 to about 40 parts by weight.

25. A composition according to claim 21 wherein component (a) is present in an amount of about 42 parts by weight, component (b) is present in an amount of about 35 parts by weight, component (c) is present in an amount of about 15 parts by weight, component (d) is present in an amount of about 8 parts by weight, and component (e) is present in an amount from about 5 to about 40 parts by weight.

* * * * *

UNITED STATES PATENT AND TRADEMARK OFFICE
CERTIFICATE OF CORRECTION

PATENT NO. : 4,892,904

DATED : January 9, 1990

INVENTOR(S) : Sai-Pei Ting

It is certified that error appears in the above-identified patent and that said Letters Patent is hereby corrected as shown below:

In Claim 1, line 10, "improved" should read as --improve--;

In Claim 6, line 1, "compositions" should read as --composition--;

In Claim 11, line 3, after "copolymers,", insert --hydrogenated or non-hydrogenated.--; and In Claim 19, line 3, "a" should read as --about--.

Signed and Sealed this

First Day of January, 1991

Attest:

HARRY F. MANBECK, JR.

Attesting Officer

Commissioner of Patents and Trademarks